Nov. 28, 1933. H. B. EASTWOOD 1,937,319
ELECTRIC HEATING UNIT
Filed Feb. 16, 1932
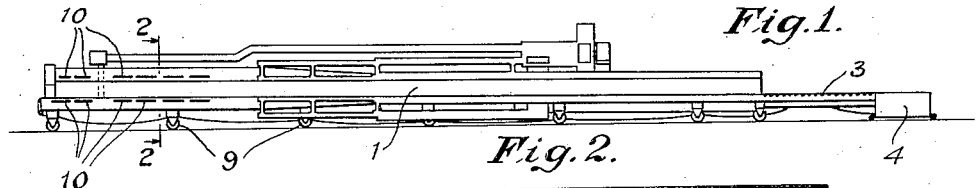
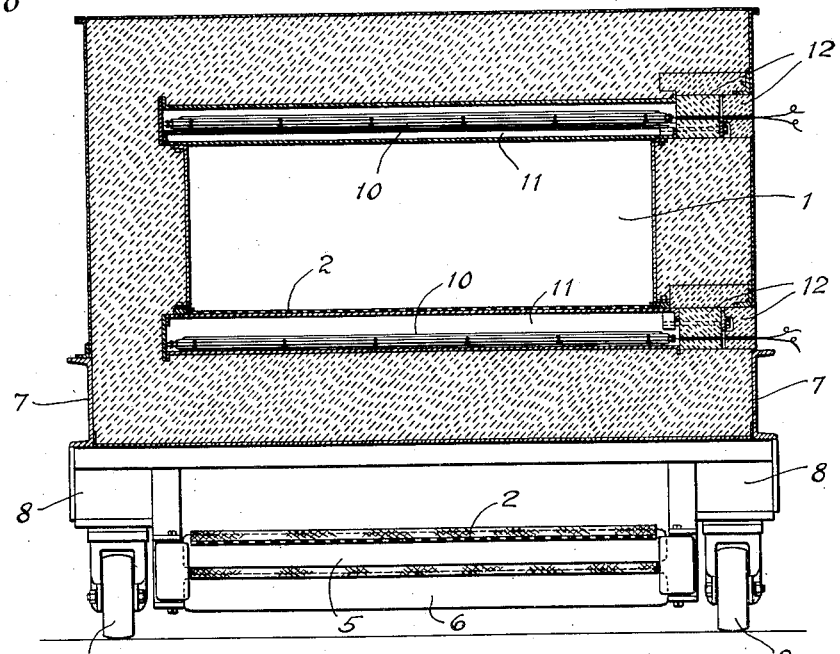
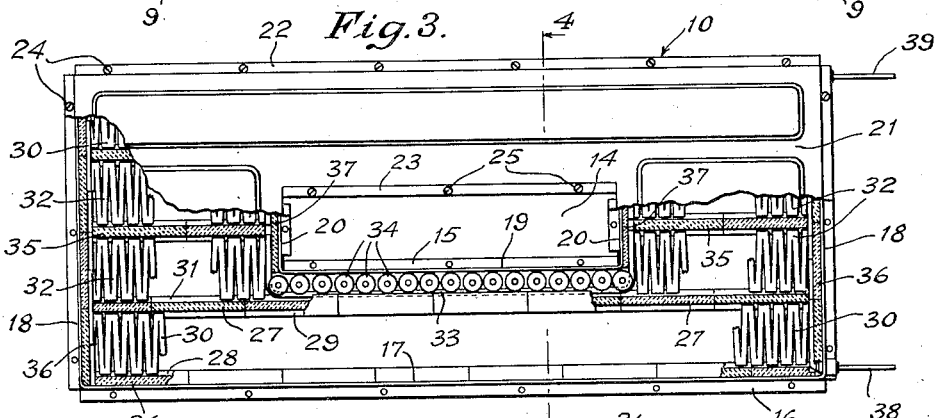
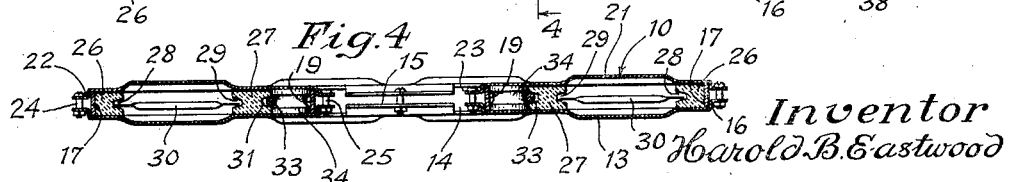
Witness:
A. A. Horn.
Inventor
Harold B. Eastwood
by Brown & Parham
Attorneys.

Patented Nov. 28, 1933

1,937,319

UNITED STATES PATENT OFFICE 1,937,319

ELECTRIC HEATING UNIT

Harold B. Eastwood, Hartford, Conn., assignor to Hartford-Empire Company, Hartford, Conn., a corporation of Delaware Application February 16, 1932. Serial No. 593,235

5 Claims. (Cl. 219—19)

This invention relates to an electric heating unit of the resistance type and particularly to a unit usable for supplying heat to glassware annealing lehrs or other heat-treating apparatus.

Among the objects of the present invention are the provision of an electric heating unit which will be easy and cheap to construct, not easily harmed or broken by handling, durable in service, and efficient in its heating action.

A further and more specific object of the invention is the provision of an electric heating unit including a suitable casing in which the unit may be enclosed and by which foreign material may be prevented from contacting with the heating element of the unit, thus preventing shorting of the heating element or any part thereof.

A further object of the present invention is the provision of an electric heating unit in which the heating element and insulators are disposed loosely within a suitable casing in such a manner that their number, arrangement and dimensions confine them against substantial movement by which they might be dislodged in directions parallel to the plane of the bottom of the casing, (the various element or elements and insulators being placed within the casing in the manner of toy blocks in a box) whereby warping or flexing of said casing incident to use or handling is ineffective to break the insulators, or if they be broken by any accident, to dislodge them.

Further objects and advantages of the present invention will become apparent from a reading of the following specification and sub-joined claims when taken in connection with the accompanying drawing, in which:

Figure 1 is a diagrammatic view, substantially in elevation, of a glassware annealing lehr in which my units are usable;

Fig. 2 is a cross section of the lehr on the line 2—2 of Fig. 1, showing in greater detail the construction and mounting of the lehr and more particularly the manner of mounting and use of the electric heating unit specifically forming the subject of this invention;

Fig. 3 is a plan view with parts broken away and in section of one of the heating units forming the subject of this invention; and Fig. 4 is a vertical section substantially on the line 4—4 of Fig. 3.

In Figs. 1 and 2, I have illustrated a glassware annealing lehr in which heating elements embodying my invention are usable, the lehr diagrammatically illustrated in Fig. 1 being substantially that disclosed in detail in the application of Wadman, Serial No. 441,793, filed April 5, 1930. This lehr comprises an elongate tunnel 1 through which glassware is conveyed in a continuous manner by an endless conveyor belt 2 passing through the tunnel in sliding contact with the floor thereof, over a ware take-off table 3 and being moved by a suitable conveying driving mechanism generally indicated at 4. The return strand of the conveyor belt 2 passes to the forward or ware-receiving end of the tunnel over a plurality of suitable rollers 5 and 6 disposed beneath the tunnel as illustrated in Fig. 2. The tunnel as a whole is mounted upon a suitable rigid supporting structure including channels 7 which are in turn supported by suitable standards 8 carrying wheels 9 which rest upon the floor of the plant in which the lehr is to be used, or upon any suitable supporting surface. Means are provided in connection with the lehr for supplying heat to and abstracting heat from the ware throughout its passage through the tunnel 1 in order to provide a desired temperature gradient in the ware for annealing and subsequently cooling the ware. These means other than the heating unit, however, form no part of the present invention and will not, therefore, be described. The tunnel 1, as illustrated in Figs. 1 and 2, is provided with a plurality of electric heating units 10, some above and some below the path of ware through the tunnel 1, the unit per se forming the particular subject matter of the present invention. As illustrated in Fig. 2, the units 10 are insertable at one side of the lehr and are supported upon suitable structures within the lehr, in the present instance in muffle chambers 11 above and below the lehr tunnel 1. These muffle chambers are closed at the end through which the units 10 are introduced by refractory and/or heat insulating blocks 12, which may be suitably secured to the lehr frame in order to retain the parts in the desired position.

Turning now more particularly to the unit 10 per se, and referring to Figs. 3 and 4 of the accompanying drawing, there is illustrated a unit including a casing structure comprising a bottom 13 of generally rectangular shape having an opening 14 of rectangular form at its center. This casing is preferably made up of thin heat-conducting material, such as sheet metal, and is provided adjacent to its inner periphery (surrounding the opening 14) and its outer periphery with flanges 15 and 16. There are also provided side and end walls 17 and 18 respectively, making up the outer periphery and 19 and 20 respectively, making up the inner peripheral walls or the periphery of the opening 14. Walls 17, 18, 19 and 20 are preferably of relatively rigid construction and are adapted to space the cover 21 from the bottom 13 of the casing. The cover 21 is preferably exactly the same as the casing bottom 13, and has flanges 22 at its outer periphery and 23 at its inner periphery securable respectively to the flanges 16 and 15 of the bottom 13 by bolts 24 for the outer peripheral flanges and 25 for the inner peripheral flanges.

Along each of the side walls 17 and intermediate the top and bottom of the casing are a row of insulating supports 26. Spaced from these rows of insulating supports are other rows of insulating supports 27 extending from end to end of the casing. The insulating supports 26 and 27 are provided with lateral grooves 28 and 29 respectively for carrying electric resistance heating elements 30, the rows of insulating supports 27 also being provided with lateral grooves 31 for purposes later to be described.

As illustrated there are at each end of the unit pairs of short electric resistance heating elements 32 extending substantially from each end of the casing to the central opening 14, although it is to be understood that any desired number of these short units may be used as also may be any desired number of the long units 30.

The short units 32, which are in prolongation of one another, are preferably electrically connected in series by suitable connections illustrated at 33, these connections taking the form of substantially round wires preferably of the same cross section and material as the cross section and material of the electric heating elements 30 and 32, so that these connections may also serve for supplying heat. Connections 33 are retained in position in the grooves 31 of the insulating supports 27 by a plurality of spool insulators 34 extending between the top and bottom of the casing and positioned laterally between the rows of insulating supports 27 and the sidewalls 19 of the central opening 14. The use of spool insulators as shown provides for air spaces communicating with the connections 33 and prevents overheating of the insulators.

As illustrated there are two of the electric resistance heating elements 32 at each end of the heating unit 10, each element 32 having one side positioned in the grooves 31 of the rows of insulating supports 27 and having their other sides respectively positioned in grooves of short rows of insulating supports 35 similar to the supports 27. The heating elements 30 and 32 are insulated at their ends from the end walls 18 and 20 of the outer and inner periphery of the casing by rows of heat insulating members 36 and 37 respectively. The insulating supports 26, 27 and 35 and the insulating members 36 and 37 are preferably of slightly less height than the spacer walls 17, 18, 19 and 20 so as to permit a slight movement in a direction perpendicular to the plane of the bottom of the casting. This in practice provides against breakage of the insulating members and supports which might occur if they were tightly clamped between the top and bottom of the casing and any flexing or warping of the casing occurred. The spool insulators 34 may or may not be provided with such a space as may be desired. The provision of a space is of lesser importance with these members due to their small lateral dimensions.

As illustrated all the electric heating elements of each unit are connected in series, current being passed from one lead 38 to one of the elements 30, as seen at the lower right in Fig. 3, from the other end of that element to the adjacent element 32, seen at the lower left in Fig. 3, from that element through the connector 33 to the aligned heating element 32, at the right (Fig. 3), thence to the other of the short elements 32 at the right in Fig. 3, thence along the other connector 33 to the other short electric heating element 32, (upper left, Fig. 3), thence to the left-hand end of the upper element 30 (as seen Fig. 3), and thence from the right-hand end of this element to the lead 39.

It will be noted that the elements 30 and 32, the rows of insulating supports 26, 27 and 35, the insulating members 36 and 37 and the spool insulators 34 have such dimensions and are so arranged within the casing as to occupy substantially all of the space intermediate the inner and outer peripheral walls thereof, but are unattached to the casing. Thus, they may be considered comparable to toy blocks in a box in that they are prevented by their number, dimensions and arrangement from movement in a direction parallel with the plane of the bottom of the casing. Also the heating elements 30 and 32 are prevented from contacting with the casing or from displacement by being located in suitable grooves, as shown at 28, 29 and 31, and the grooves of supports 35, so that they cannot be dislodged by any rough handling to which the unit may be subjected. Also in view of the fact that the insulating members and supports and spool insulators are unattached to the casing and are constructed in relatively small sections, any warping or flexing of the casing due to its light construction will have little or no tendency to cause breakage of any of the insulating supports, or if they be broken, will have little or no tendency to displace them as they are confined by the top and bottom walls of the casing against movement in a direction perpendicular to the plane of the bottom of the casing.

In view of the fact that the top and bottom of the casing are substantially the same and the various parts within the casing are prevented from substantial movement which would displace them in any way, the unit as a whole is reversible and may be used with either side up, so, for example, if the casing warps in a particular way, it may be reversed in order that subsequent warping may tend to bring it back toward its original normal flat form.

One of the chief difficulties with the use of electric heating elements in a muffle lehr as here illustrated is that the heat necessarily used is so great that the metal forming the muffle chambers scales from the walls of these chambers, the material falling therefrom getting into or on the electric elements and shorting some portion thereof with danger of burning out the elements. This is prevented in the structure of my present invention as the elements are completely encased. Also if the unit is used in a lehr or other heat treating apparatus but not enclosed in a muffle, the cover is of importance in preventing ingress of foreign matter.

While I have shown but one embodiment of my present invention, it will be obvious that many changes may be made therein and that the ideas embodied in the present disclosure may be incorporated into other structures. I do not wish to be limited, therefore, except by the scope of the appended claims, which are to be construed as broadly as the state of the prior art permits.

I claim:

1. An electric heating unit, comprising a relatively flat casing including a bottom and sides, a plurality of insulating supports in said casing but unattached and free to move with respect thereto, and an electric resistance heating element carried by said supports and unenclosed thereby, the dimensions of said element and the number, arrangement and dimensions of said supports being such as collectively substantially to cover the bottom of said casing and thereby prevent lateral displacement of said element and said supports from their desired positions in said casing.

2. An electric heating unit, comprising a relatively flat casing of light flexible material including a bottom and sides, a plurality of insulating supports in said casing but unattached and free to move with respect thereto, an electric resistance heating element carried by said supports and unenclosed thereby, the dimensions of said element and the number, arrangement and dimensions of said supports being such as collectively substantially to cover the bottom of said casing and thereby prevent lateral displacement of said element and said supports from their predetermined positions therein, and a cover for said casing for preventing displacement of said supports and thereby of said element due to substantial movements in a direction perpendicular to the plane of the bottom of said casing and preventing the entry of foreign materials into the interior of said casing, whereby said casing is reversible in use and whereby warping or flexing of said casing will have a minimum tendency to break said supports, or if they be broken, to dislodge them.

3. An electric heating unit, comprising a relatively flat casing of light sheet metal construction including a bottom, side and end walls, an electric resistance heating element in said casing, a plurality of insulating supports unattached to said casing and free to move in the plane thereof for separating the sides and ends of said element from said side and end walls of said casing and for spacing said element from the bottom of said casing, said element being unenclosed by said supports, the dimensions of said element and the number, arrangement and dimensions of said supports collectively being such that said element and said supports fit into said casing to cover substantially all the bottom thereof between said side and end walls and thereby are prevented from movement in directions parallel to the plane of the bottom of said casing by which they could be dislodged, and a cover member for said casing for preventing substantial movement of said supports and thereby of said element in a direction perpendicular to the plane of the bottom of said casing.

4. An electric heating unit, comprising a rectangular relatively flat casing of thin heat conducting material including a bottom, side and end walls, a substantially rectangular opening at the center of said casing, side and end walls forming a peripheral boundary for such opening, a plurality of insulating supports in said casing but unattached thereto, certain of which are adjacent to the inner and outer peripheral walls of said casing, a plurality of electric resistance heating elements carried by said supports and spaced from said casing thereby, the number, arrangement and dimensions of said elements and said supports being such that collectively they cover substantially the entire free area of the bottom of said casing between the inner and outer peripheral walls thereof and thereby prevent lateral displacement of said elements and said supports in directions parallel to the plane of the bottom of said casing, and a cover for said casing for confining said elements and said supports in place by preventing any substantial movement thereof in a direction perpendicular to the plane of the bottom of said casing, whereby flexing or warping of said casing will have a minimum tendency to break said supports, or if they be broken, to dislodge them, and whereby said unit is reversible.

5. An electric heating unit, comprising a relatively flat rectangular casing having a rectangular opening centrally thereof, said casing including a bottom, inner and outer peripheral walls about said opening and the outside of said casing respectively, a row of insulating members in said casing along each end of the inner and outer peripheral walls, a row of insulating supports in said casing positioned against the outer side peripheral walls, rows of insulating supports parallel to the last named rows and spaced inwardly toward the center of said casing therefrom, electric resistance heating elements extending longitudinally of said casing and supported by the insulating supports along the sides thereof and the rows of insulating supports parallel thereto, at least one electric resistance heating element extending between each end of said casing and the end of said opening adjacent thereto and supported by the last named rows of insulating supports, a connection between the last named electric resistance heating elements extending along one side of said opening, a plurality of spool insulators for supporting said connection and spacing it from the side wall of said central opening, all said insulating members and supports and said spool insulators being unattached to said casing, and a cover member constructed similarly to the bottom of said casing for preventing the ingress of foreign material into the heating unit and for preventing dislodging movement of said insulating members, supports and spool insulators in a direction perpendicular to the plane of said bottom, the number, arrangement and dimensions of all said elements, said insulating members and supports and said spool insulators being such as substantially to cover the area of the bottom of said casing between the inner and outer peripheral walls, whereby said unit is reversible, and whereby flexing or warping of said unit will have a minimum tendency to break said insulating members and supports, and said spool insulators, or if they be broken to dislodge them.

HAROLD B. EASTWOOD.